United States Patent
Rodriguez De La Concepcion et al.

(10) Patent No.: US 12,038,342 B2
(45) Date of Patent: Jul. 16, 2024

(54) TRANSDUCER FOR MEASURING THE CHARACTERISTICS OF A CLAMPING INSTRUMENT

(71) Applicant: ATLAS COPCO INDUSTRIAL TECHNIQUE AB, Stockholm (SE)

(72) Inventors: Abel Rodriguez De La Concepcion, Cesano Maderno (IT); Salvatore D'Amico, Lentate Sul Seveso (IT)

(73) Assignee: ATLAS COPCO INDUSTRIAL TECHNIQUE AB, Stockholm (SE)

( * ) Notice: Subject to any disclaimer, the term of this patent is extended or adjusted under 35 U.S.C. 154(b) by 212 days.

(21) Appl. No.: 17/782,029

(22) PCT Filed: Dec. 17, 2020

(86) PCT No.: PCT/IB2020/062093
§ 371 (c)(1),
(2) Date: Jun. 2, 2022

(87) PCT Pub. No.: WO2021/124185
PCT Pub. Date: Jun. 24, 2021

(65) Prior Publication Data
US 2022/0373410 A1    Nov. 24, 2022

(30) Foreign Application Priority Data
Dec. 19, 2019    (IT) ................ 102019000024721

(51) Int. Cl.
*G01L 3/10*      (2006.01)
*G01L 5/00*      (2006.01)
*B25B 23/14*     (2006.01)

(52) U.S. Cl.
CPC ............ *G01L 3/105* (2013.01); *G01L 5/0042* (2013.01); *B25B 23/14* (2013.01)

(58) Field of Classification Search
CPC ....... G01L 3/105; G01L 5/0042; G01L 3/104; B25B 23/14
See application file for complete search history.

(56) References Cited

U.S. PATENT DOCUMENTS

| | | | | |
|---|---|---|---|---|
| 5,557,975 A | * | 9/1996 | Crane ................... | G01L 3/108 |
| | | | | 439/28 |
| 7,836,782 B2 | * | 11/2010 | Cook ................... | G01P 3/488 |
| | | | | 73/862.331 |
| 2009/0320614 A1 | | 12/2009 | Cook et al. | |

FOREIGN PATENT DOCUMENTS

| | | |
|---|---|---|
| DE | 43 07 131 A1 | 9/1994 |
| GB | 1 576 006 A | 10/1980 |

(Continued)

OTHER PUBLICATIONS

International Search Report issued Feb. 15, 2021 in PCT/IB2020/062093 filed on Dec. 17, 2020, 3 pages.

(Continued)

*Primary Examiner* — Freddie Kirkland, III
(74) *Attorney, Agent, or Firm* — Oblon, McClelland, Maier & Neustadt, L.L.P.

(57) ABSTRACT

A transducer for measuring the characteristics of a clamping instrument includes a stator which has an annular support adapted to form a substantially cylindrical longitudinal cavity adapted to receive a rotor which is also substantially shaped cylindrical adapted to rotate inside this cavity of the stator around its longitudinal axis, this rotor being provided at one end with a seat for insertion into it of the head of an instrument of tightening which determines such rotation around the axis, and a sensor arranged on its body capable of detecting specific parameters of the tightening of the instrument, and generating corresponding electrical signals. The transducer includes a magnetic coupling device adapted to transfer electrical energy from the stator to the rotor and (Continued)

an optical coupling device adapted to transfer the electrical signals generated by said sensor means from the rotor to the stator.

10 Claims, 3 Drawing Sheets

(56) References Cited

FOREIGN PATENT DOCUMENTS

| | | |
|---|---|---|
| GB | 2488139 A | 8/2012 |
| WO | WO 2014/155334 A2 | 10/2014 |
| WO | WO 2016/055933 A1 | 4/2016 |

OTHER PUBLICATIONS

International Preliminary Report on Patentability issued Dec. 7, 2021 in PCT/IB2020/062093 filed on Dec. 17, 2020, 13 pages.

* cited by examiner

TRANSDUCER FOR MEASURING THE CHARACTERISTICS OF A CLAMPING INSTRUMENT

The present invention refers to a transducer of the type used to measure the torque or other parameters exercised by a clamping instrument, such as an industrial screwdriver, a torque wrench, a drill driver, etc. . . .

By measuring the torque exerted during screwing it is possible to determine the quality of the instrument that carried out the operation.

The assessment of the quality of a clamping instrument is a very felt problem, for this purpose electronic transducers for measuring the characteristics of industrial screwdrivers that comprise sensors adapted to measure parameters such as torque, force, angle, length and combinations of the aforesaid parameters are made. A field of application of these devices is the one for checking the clamping behaviour of industrial screwdrivers by measuring the rotating and/or braking torque of the rotating shaft. The test of a screwdriver is a procedure that involves carrying out a clamping sequence for which torque and angle are measured by means of a transducer.

Clamping is carried out on test benches provided with braking devices that simulate a real clamping, for example of a screw or a bolt. The transducers object of the present invention in this context are interposed between the clamping instrument and the braking device.

The check of the quality of a screwdriver by measuring these parameters is sometimes not very precise and affected by errors in particular on the measurement of the parameters that the transducer must perform.

These transducers are essentially cylindrical and comprise a stator inside which a rotor is housed having at one end a seat in which for example the head of the screwdriver to be tested is inserted.

The sensors are normally housed in the rotor, for example made by means of strain-gauges, which are sensitive to the torsion that the rotor undergoes due to the effect of the torque exerted by the screwdriver. The signals of the sensor must then be transferred to the stator in order to then be read outside the device.

The communication of the electrical signals as well as the electrical energy necessary for the operation of the sensors must be transferred from the stator to the rotor and vice versa.

U.S. Pat. No. 5,557,975 describes a torque transducer in which the connection between the stator and the rotor takes place by means of brushes. In particular, the body of the rotor has rings of electrically conductive material which rotate together with the rotor itself and the stator has blades which are kept in contact with said annular races of the rotor by means of retaining springs. In this way the blades act as brushes sliding on the rings and in this way the electrical contact between the rotor and the stator is ensured.

The Applicant has observed that this solution is suitable only for low rotation speeds and under conditions in which the vibrations are not excessive. However, when implemented in high-speed applications and/or subjected to mechanical vibration, the contact strength, durability and overall reliability are significantly degraded.

The solution presented herein is particularly suitable for measuring the torque supplied by impulse devices, as they are devices subject to types of vibrations such as those indicated above.

Another common solution for such transducers is obtained with rotary transformers. These transformers allow transferring power and signal on the same channel using an amplitude modulation scheme. The signal bandwidth, however, is mostly limited to tens of kilo bits per second. The wireless energy transfer used in smartphones and electric toothbrushes makes use of these transformers for battery charging.

The present invention aims to obviate the aforementioned drawbacks by making a transducer which acquires and digitizes the data of the sensors on the rotor and is therefore digitally transmitted to the stator without using electromechanical contacts or brushes.

To achieve this objective reliably and efficiently, two different channels are used for the transfer of data from the sensors and electrical power supply.

In order to transfer electrical energy to the rotor, usage is made of a rotary transformer for transferring data from the sensors to the stator and an optical communication channel.

One aspect of the present invention relates to a transducer for measuring the characteristics of a clamping instrument having the characteristics of the attached independent claim 1.

Further characteristics are contained in the attached dependent claims.

Further characteristics and advantages of the present invention will become clear from the following detailed description and the appended figures, provided solely by way of non-limiting example, wherein.

Figure 1:
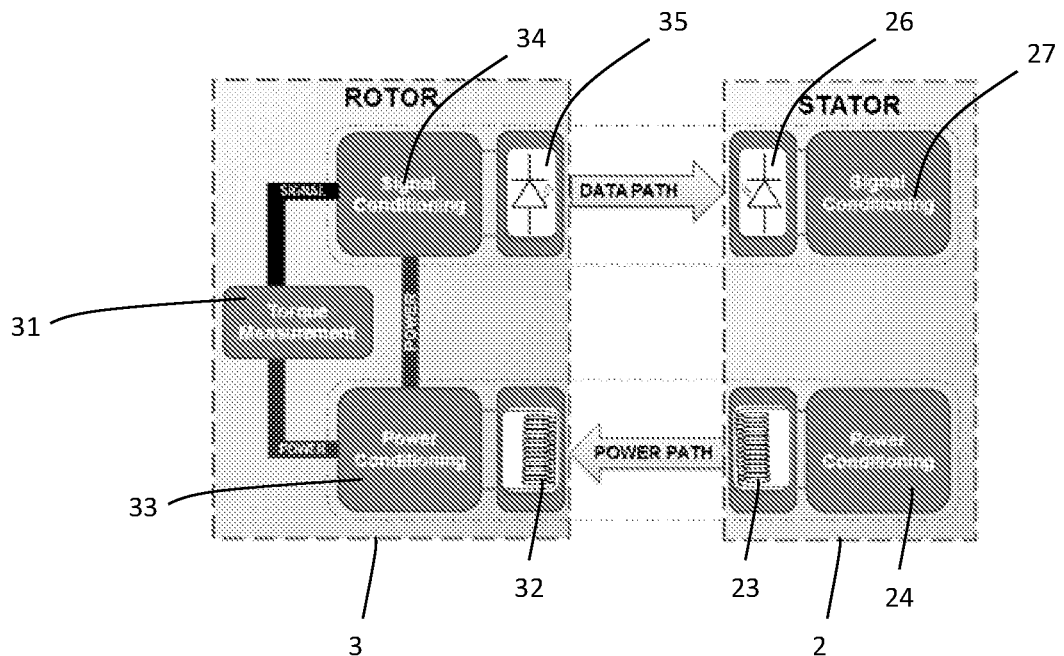
FIG. 1 represents an operating diagram of the transducer according to the present invention.
Figure 2:
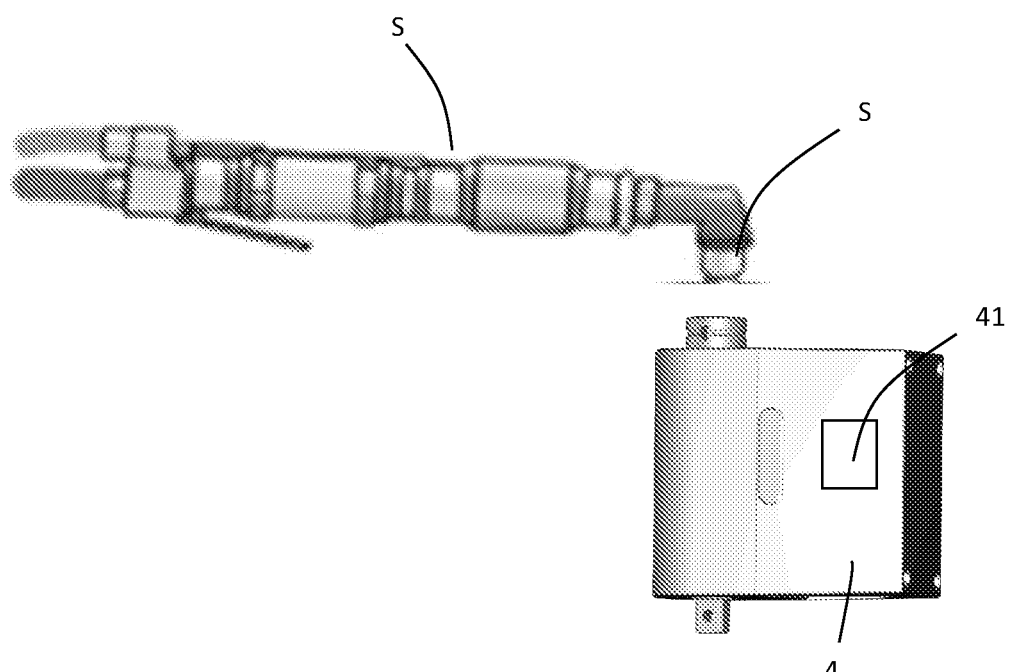
FIG. 2 illustrates the transducer in perspective view according to the present invention.
Figure 3:
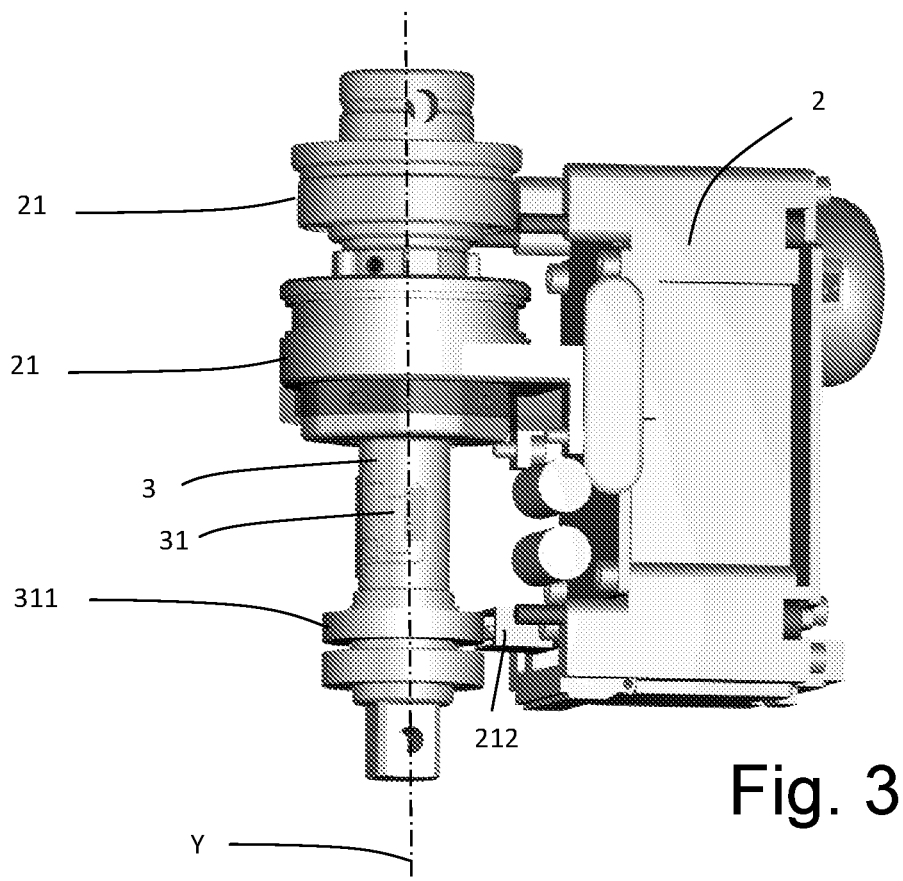
FIG. 3 illustrates the transducer in perspective view without the protective casing according to the present invention.
Figure 4:
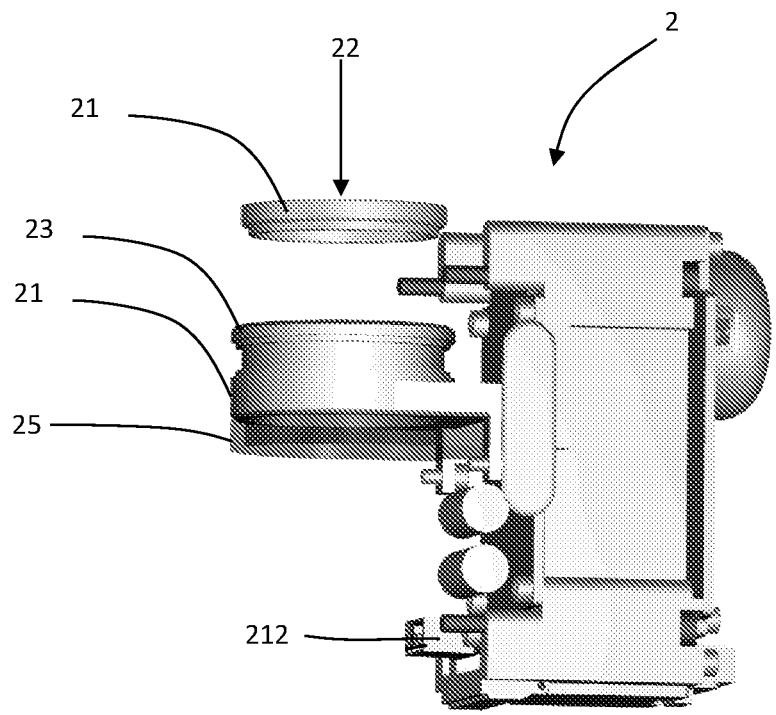
FIG. 4 illustrates the stator of the transducer in perspective view according to the present invention.
Figure 5:
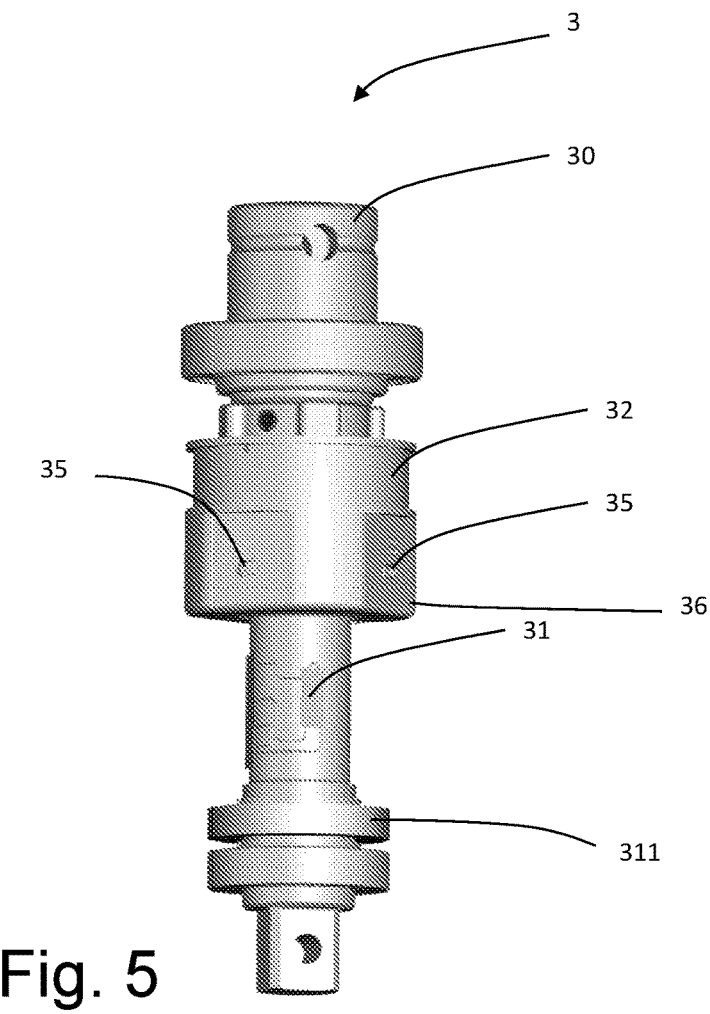
FIG. 5 shows the rotor of the transducer in perspective view according to the present invention.
Figure 6:
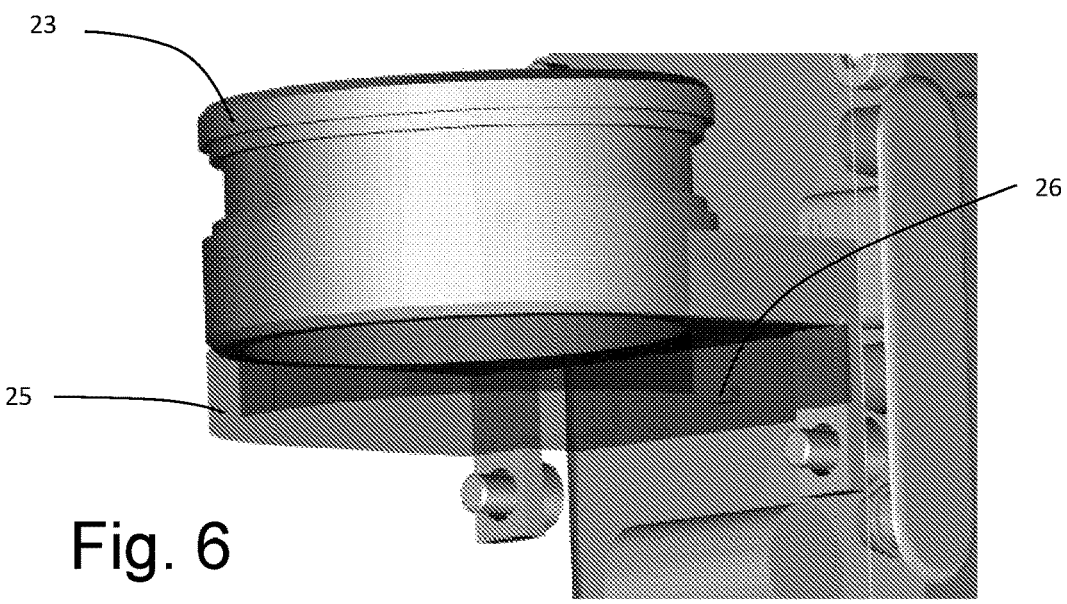
FIG. 6 illustrates an enlarged view of the portion of the stator where there are optical coupling means.

With reference to the aforementioned figures, the transducer according to the present invention is a stator 2 which has annular support means 21 which house suitable bearings, adapted to form a substantially cylindrical longitudinal cavity 22 which receives a rotor 3 which is also substantially cylindrical in shape and which rotates inside the cavity 22 of the stator around its longitudinal axis Y. This rotor is provided at one end with a seat 30 for insertion into it of the head T of an instrument of tightening S which determines such rotation around the axis Y, and of sensor means 31 arranged on its body capable of detecting specific parameters of the tightening of the instrument, such as the torque exerted by the rotor and of emitting corresponding electrical signals. Such sensor means can be, for example, strain gauges adapted to measure this torque. Furthermore, at least one sensor is provided for detecting the rotation of the rotor comprising on the rotor itself a ring 311 provided with a plurality of magnetic polarizations, and on the stator a rotation angle detector 212 which carries out the measurements detecting said polarizations.

Both the rotor and the stator are housed in a casing 4 on which a user interface 41 and relative display are also arranged.

According to the present invention, the transducer comprises magnetic coupling means adapted to transfer electrical energy from the stator to the rotor and optical coupling means adapted to transfer the electrical signal detected by said sensor means from the rotor to the stator.

Said magnetic coupling means comprise a primary coil 23 on the stator, suitably electrically powered by means of a stator supply circuit 24 which is coupled with a secondary coil 32 placed on the rotor, which receives the electromagnetic induction generated by the primary coil and transforms it into electrical energy. This electrical energy generated by the secondary coil is used to electrically supply the sensor means 31 through an electrical distribution circuit 33.

The two coils are made in the form of concentric rings so that the rotor coil rotates inside the stator coil.

Said optical coupling means comprise at least one driving circuit 34 for at least one LED 35 (for example an infrared) placed on the rotor receiving the signals from the sensors and retransmitting them in the form of a light signal indicative of the signals generated by the sensor means in the direction of at least one waveguide 25 placed on the stator, which in turn directs said optical signals in the direction of at least one photodiode 26 placed on the stator.

Furthermore, a further circuit 27 for decoding and transmitting the signals received by the photodiode is arranged on the stator.

Preferably, the aforesaid driving circuit digitizes the signals generated by the sensor means, so that advantageously the optically transmitted signals are digital signals.

Preferably, in these optical coupling means, the LEDs are four placed so as to send the optical signals in a radial direction equidistant from each other. For this purpose, said LEDs can be advantageously placed on a central ring 36 of the rotor and said waveguide 25 surrounds said central ring so as to intercept the optical beam emitted by said LEDs.

The waveguide can be made of plastic material and is carefully shaped to redirect the light coming from 360 degrees inside the ring and direct it towards the position on the stator where the photodiode is present.

The invention claimed is:

1. A transducer for measuring the characteristics of a clamping instrument comprising:
   a stator which has annular support means adapted to form a substantially cylindrical longitudinal cavity adapted to receive a rotor which is also substantially shaped cylindrical adapted to rotate inside this cavity of the stator around its longitudinal axis, this rotor being provided at one end with a seat for insertion into it of the head of an instrument of tightening which determines such rotation around the axis, and of sensor means arranged on its body capable of detecting specific parameters of the tightening of the instrument, and generating corresponding electrical signals; and
   magnetic coupling means adapted to transfer electrical energy from the stator to the rotor and optical coupling means adapted to transfer the electrical signals generated by said sensor means from the rotor to the stator, wherein said optical coupling means comprise at least one driving circuit for at least one LED placed on the rotor receiving the signals from the sensors and retransmitting them in the form of a light signal indicative of the signals generated by the sensor means in the direction of at least one waveguide placed on the stator, which in turn directs said optical signals in the direction of at least one photodiode also placed on the stator.

2. The transducer according to claim 1, wherein said magnetic coupling means comprise a primary coil on the stator, suitably electrically powered by a stator supply circuit which is coupled with a secondary coil placed on the rotor, which it receives the electromagnetic induction generated by the primary coil and transforms it into electrical energy, this electrical energy generated by the secondary coil being used to electrically supply the sensor means through an electrical distribution circuit.

3. The transducer according to claim 2, wherein the two coils are made in the form of concentric rings so that the rotor coil rotates inside the stator coil.

4. The transducer according to claim 1, wherein said driving circuit digitizes the signals generated by said sensor means.

5. The transducer according to claim 1, wherein the LEDs are four placed so as to send the optical signals in a radial direction equidistant from each other.

6. The transducer according to claim 1, wherein said LEDs are positioned on a central ring of the rotor and said waveguide surrounds said central ring so as to intercept the optical beam emitted by said LEDs.

7. The transducer according to claim 1, wherein said LEDs are infrared.

8. The transducer according to claim 1, wherein both the rotor and the stator are inserted in a casing on which a user interface and relative display are also arranged.

9. The transducer according to claim 1, wherein said sensor means are strain gauges suitable for measuring the torque exerted.

10. The transducer according to claim 1, comprising at least one sensor for detecting the rotation of the rotor comprising on the rotor itself a ring provided with a plurality of magnetic polarizations, and on the stator a rotation angle detector which carries out the measurements detecting said polarizations.

* * * * *